Jan. 6, 1931. R. M. KERSCHNER 1,787,533
INSULATOR SUPPORT
Filed Aug. 29, 1927
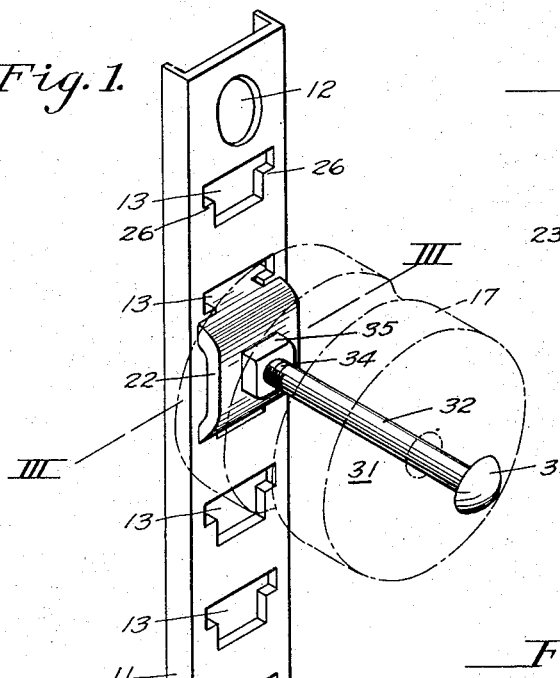
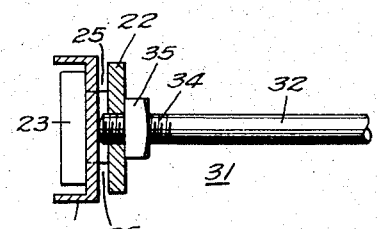
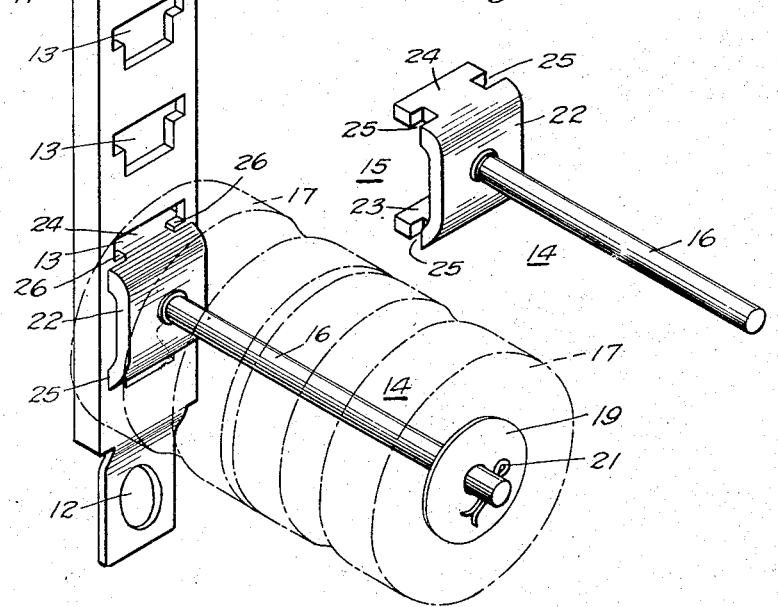
Inventor
Richard M. Kerschner
By Green & McCallister
His Attorneys Patented Jan. 6, 1931

1,787,533

UNITED STATES PATENT OFFICE

RICHARD M. KERSCHNER, OF PITTSBURGH, PENNSYLVANIA, ASSIGNOR TO HUBBARD & COMPANY, A CORPORATION OF PENNSYLVANIA

INSULATOR SUPPORT

Application filed August 29, 1927. Serial No. 216,135.

This invention relates to insulator supports and more particularly to hooks for connecting the insulator to a supporting rack.

An object of this invention is to provide an insulator hook for mounting insulators on a rack that shall be simple in structure and inexpensive to manufacture.

Another object of this invention is to provide an insulator hook for engaging a rack that shall be especially adaptable for over head mountings.

A further object of this invention is to provide a hook having the above characteristics and means that shall rigidly lock the hook to a rack.

These and other objects that may be made apparent throughout the further description of this invention are attained by means of the apparatus hereinafter described and illustrated in the accompanying drawings wherein, Figure 1 is a perspective view of an insulator rack having disposed thereon two insulator hooks, each of which illustrate a slightly different embodiment of the invention.

Fig. 2 is a perspective view of one form of an insulator hook embodying the invention.

Fig. 3 is a sectional view taken along the line 3—3 of Fig. 1.

In the drawings, 11 is an insulator rack having an opening 12 disposed in each of its ends for cooperating with any suitable means (not shown) for fastening the rack to a wall or roof as may be desired. The insulator rack is provided with spaced openings 13 of T-shape. The insulator rack may be of any desired length and provided with any number of T-shaped openings spaced apart at any predetermined distance.

One form of a hook embodying this invention is illustrated at 14 in Fig. 1. Fig. 2 is a perspective view of this same form of a hook showing more in detail a means 15 for fastening the hook 14 to the rack 11.

The hook 14 comprises a pin 16 for receiving an insulator or insulators 17 and is provided with a washer 19 for retaining the insulator on the pin 16. A cotter pin 21 is provided at one end of the pin 16 for locking the washer 19 and insulators 17 on the pin 16. The pin 16 is disposed on a U-shaped base member 22 and the arms 23 and 24 of the U-shaped base member terminate in the form of a T for engaging and cooperating with the openings 13 disposed in the rack 11.

The dimensions of the T-shaped arms 23 and 24 are substantially the same as the inner dimensions of the T-shaped openings 13. It can be seen from the drawings that the means 15 for connecting the hook to the rack comprises the T-shaped arms 23 and 24 which are adapted to be received by the head portion of the T-shaped openings 13, the distance between the T-shaped arms being substantially the same as the distance between adjacent openings 13. The slots 25 formed by the T-shape of the arms 23 and 24 have substantially the same dimensions as the corresponding portions 26 adjacent the openings 13 and are adapted to receive the portions 26.

The form of a hook illustrated at 14 is very simple, inexpensive to manufacture and is easily attached and detached from the rack. This form of hook is very desirable for use with racks mounted perpendicularly.

Another form of hook illustrating a slightly different embodiment of this invention is shown at 31 in Fig. 1. The base member 22 and arms 23 and 24 are substantially the same as that described for the hook 14 and the base member 22 of the hook 31 is provided with a bolt 32 having a head portion 33 on one of its ends, the other end being connected to the base member 22 by a threaded means 34. The threaded means 34 is provided with a locking nut 35 for locking the bolt 32 in fixed relation to the base 22.

Referring particularly to Fig. 3 which is a sectional view taken along the line 3—3 of Fig. 1, the bolt 32 is employed to lock the base member 22 to the rack 11 when the arms 23 and 24 are positioned in the slots 13. This is accomplished by merely screwing the bolt 32 into the base member 22 until the point of the bolt comes in contact with the rack 11 which tightly fastens the base member to the rack 11. The locking nut 35 serves to lock the bolt and base member 22 in rigid fixed relation.

The hook 31 is also very simple and inexpensive to manufacture and is very desirable for use with cable racks mounted to the roofs of man-holes or other over-head mountings. It will readily be seen from the above that the point of the bolt locks the base member 22 to the rack in rigid fixed relation. The bolt 32 or pin 16 may be any desired length for supporting any required number of insulators.

While I have illustrated and described this invention in connection with mountings of round or spool insulators it will be obvious to those skilled in the art that the means 15 may readily be adapted for fastening any type of insulator having a suitable support to the base member 22 and that the hooks described above may be positioned to mount insulators for supporting both horizontal and vertical cables. It will also be obvious that a single hook may be adapted for mounting one or more insulators and likewise one or more hooks may be employed for mounting insulators for supporting a single cable therebetween. Other changes, modifications, substitutions, additions and omissions may be made without departing from the spirit and scope of the appended claims.

What I claim as new and desire to secure by Letters Patent is:

1. An insulator support comprising a U-shaped base member, the arms of the base member having oppositely disposed notches therein, a pin disposed on the base member for receiving an insulator and means for retaining the insulator on the pin.

2. An insulator support comprising an insulator pin having a U-shaped member disposed on one of its ends, the arms of the U-shaped member terminating in the form of a T.

3. An insulator mounting comprising a rack having spaced openings of T-shape, a pin for engaging an insulator having means disposed on one of its ends for connecting the pin to the rack, the said means comprising a plurality of T-shaped projections.

4. An insulator support comprising a rack having spaced openings therein, a member having projections thereon for engaging a plurality of the said openings and a threaded opening therein, a pin for receiving the insulator having a threaded portion for engaging and cooperating with the threaded opening of the said member whereby the said pin may be screwed into the said threaded opening and into contact with the said rack for locking the said member in fixed relation to the rack.

5. An insulator support including a rack provided with openings formed therein, a member having projections cooperating with said openings for supporting said member on said rack, an insulator supporting pin threaded through said member and adapted to engage said rack for locking said member in place, and means for locking said pin against movement.

In testimony whereof, I have hereunto subscribed my name this 22nd day of August, 1927.

RICHARD M. KERSCHNER.